(12) United States Patent
Kitta

(10) Patent No.: US 8,079,749 B2
(45) Date of Patent: Dec. 20, 2011

(54) DOUGH MIXER AND MIXING BOWL WITH REFRIGERATION JACKET

(75) Inventor: Kenneth Kitta, Wapakoneta, OH (US)

(73) Assignee: Illinois Tool Works Inc., Glenview, IL (US)

( * ) Notice: Subject to any disclaimer, the term of this patent is extended or adjusted under 35 U.S.C. 154(b) by 805 days.

(21) Appl. No.: 12/186,776

(22) Filed: Aug. 6, 2008

(65) Prior Publication Data

US 2010/0034046 A1  Feb. 11, 2010

(51) Int. Cl.
*B01F 15/06* (2006.01)
(52) U.S. Cl. .......................................... 366/149; 62/342
(58) Field of Classification Search ................ 366/149; 62/342
See application file for complete search history.

(56) References Cited

U.S. PATENT DOCUMENTS

| | | | |
|---|---|---|---|
| 2,265,552 A | 12/1941 | Sticelber | |
| 2,274,220 A | 2/1942 | Sticelber | |
| 2,415,711 A * | 2/1947 | Sticelber | 62/342 |
| 3,503,344 A | 3/1970 | Sternberg | |
| 4,275,568 A | 6/1981 | Zielsdorf | |
| 6,047,558 A | 4/2000 | Hall | |

OTHER PUBLICATIONS

PCT, International Search Report and Written Opinion, International Application No. PCT/US2009/051094 (Oct. 27, 2010).
PCT, International Preliminary Report on Patentability, International Application No. PCT/US2009/051094 (Feb. 17, 2011).

* cited by examiner

*Primary Examiner* — David Sorkin
(74) *Attorney, Agent, or Firm* — Thompson Hine LLP

(57) ABSTRACT

A dough mixer includes a cabinet and a bowl supported within the cabinet. The bowl includes a bowl body defining an opening through which dough is inserted into the bowl for a mixing operation. An agitator is mounted in the bowl for rotation therein. A refrigeration jacket is mounted to an exterior of the bowl body. The refrigeration jacket includes a plurality of channel members. Each channel member includes a unitary plate member having an elongated center panel extending along a periphery of the bowl body. The center panel is spaced from and facing the bowl body. A first leg is connected to the center panel by a first bend. The first leg extends toward the bowl body. A second leg is connected to the center panel by a second bend. The second leg extends away from the bowl body.

21 Claims, 6 Drawing Sheets

DOUGH MIXER AND MIXING BOWL WITH REFRIGERATION JACKET

TECHNICAL FIELD

This application relates generally to dough mixers and more particularly to a dough mixer including a mixing bowl with refrigeration jacket.

BACKGROUND

Bread dough is often mixed at controlled temperatures (e.g., about 78° F. to about 80° F.). During mixing, friction and viscous shear causes temperature to rise in the dough, which can cause the dough to become sticky and difficult to process.

Mixers are known that utilize cooled mixing components to control temperature of the dough during a mixing process. For example, U.S. Pat. No. 4,275,568 discloses a mixing bowl for a mixer that includes flow passages in a sheet panel through which a cooling fluid passes.

SUMMARY

In an aspect, a dough mixer includes a cabinet and a bowl supported within the cabinet. The bowl includes a bowl body defining an opening through which dough is inserted into the bowl for a mixing operation. An agitator is mounted in the bowl for rotation therein. A refrigeration jacket is mounted to an exterior of the bowl body. The refrigeration jacket includes a plurality of channel members. Each channel member includes a unitary plate member having an elongated center panel extending along a periphery of the bowl body. The center panel is spaced from and facing the bowl body. A first leg is connected to the center panel by a first bend. The first leg extends toward the bowl body. A second leg is connected to the center panel by a second bend. The second leg extends away from the bowl body.

In another aspect, a dough mixer a cabinet and a bowl supported within the cabinet. The bowl includes a bowl body defining an opening through which dough is inserted into the bowl for a mixing operation. An agitator is mounted for rotation within the bowl. A refrigeration jacket is mounted to an exterior of the bowl body. The refrigeration jacket includes a plurality of channel members. Each channel member includes an elongated center panel extending about a periphery of the bowl body. The center panel is spaced from and faces the bowl body. A first leg is connected to the center panel by a first bend that turns toward the bowl body. A second leg is connected to the center panel by a second bend that turns away from the bowl body.

In another aspect, for a dough mixer including a cabinet, a bowl supported within the cabinet, the bowl includes a bowl body defining an opening through which dough is inserted into the bowl for a mixing operation, an agitator mounted for rotation within the bowl and a refrigeration jacket mounted to an exterior of the bowl body. The refrigeration jacket includes a channel member including an elongated center panel extending along a periphery of the bowl body. The center panel is spaced from and faces the bowl body. A first leg is connected to the center panel by a first bend. The first leg extends toward the bowl body. A second leg is connected to the center panel by a second bend. The second leg extends away from the bowl body.

In another aspect, a method of forming a refrigeration jacket for a dough mixer including a cabinet, a bowl supported within the cabinet, the bowl comprising a bowl body defining an opening through which dough is inserted into the bowl for a mixing operation and an agitator mounted for rotation within the bowl is provided. The method includes forming a plurality of channel members such that each channel member includes an elongated center panel. A first leg is connected to the center panel by a first bend and a second leg connected to the center panel by a second bend. The plurality of channel members are mounted to the bowl body such that the first leg extends toward the bowl body. The second leg extends away from the bowl body and the center panel is spaced from and faces the bowl body.

The details of one or more embodiments are set forth in the accompanying drawings and the description below. Other features, objects, and advantages will be apparent from the description and drawings, and from the claims.

DETAILED DESCRIPTION

Figure 1:
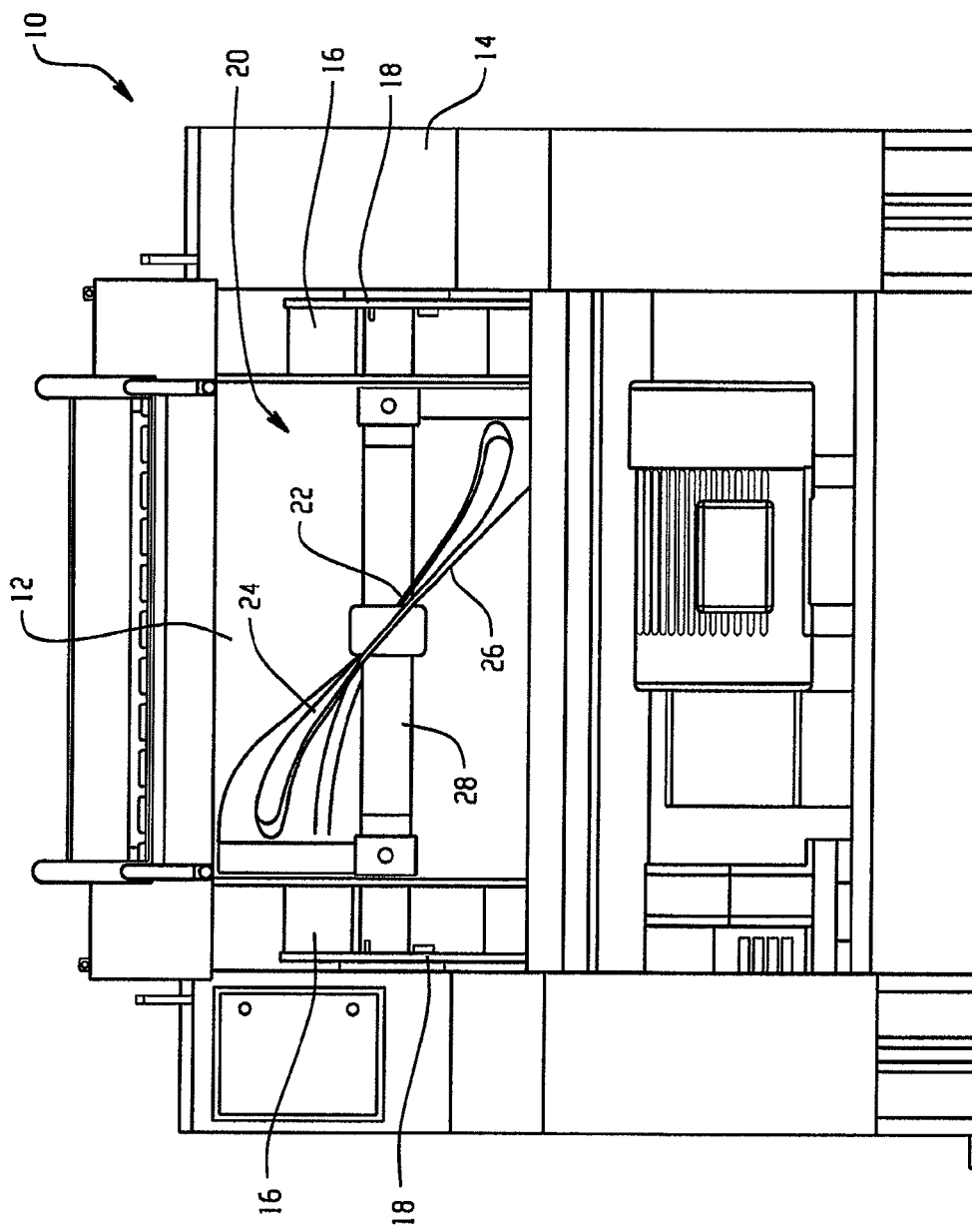
FIG. 1 is a front view of an embodiment of a mixer.

Referring to FIG. 1, a mixer 10 includes a mixing bowl 12 mounted within a cabinet 14. The mixing bowl 12 is an open top 20 arrangement that, in this illustration, is rotated to a sideways position. The mixing bowl 12 is supported at each end by support members 16 that are mounted to a support plate 18. An agitator 22 is rotatably mounted within the mixing bowl 12. The agitator 22 includes a pair of mixing arms 24 and 26 and a rotatable shaft 28 that supports and rotates the mixing arms 24 and 26 during a mixing operation. While agitator 22 is shown by FIG. 1, various agitator assemblies can be utilized including refrigerated agitator assemblies such as that described by U.S. Pat. No. 6,047,558, the details of which are hereby incorporated by reference as if fully set forth herein.

Figure 2:
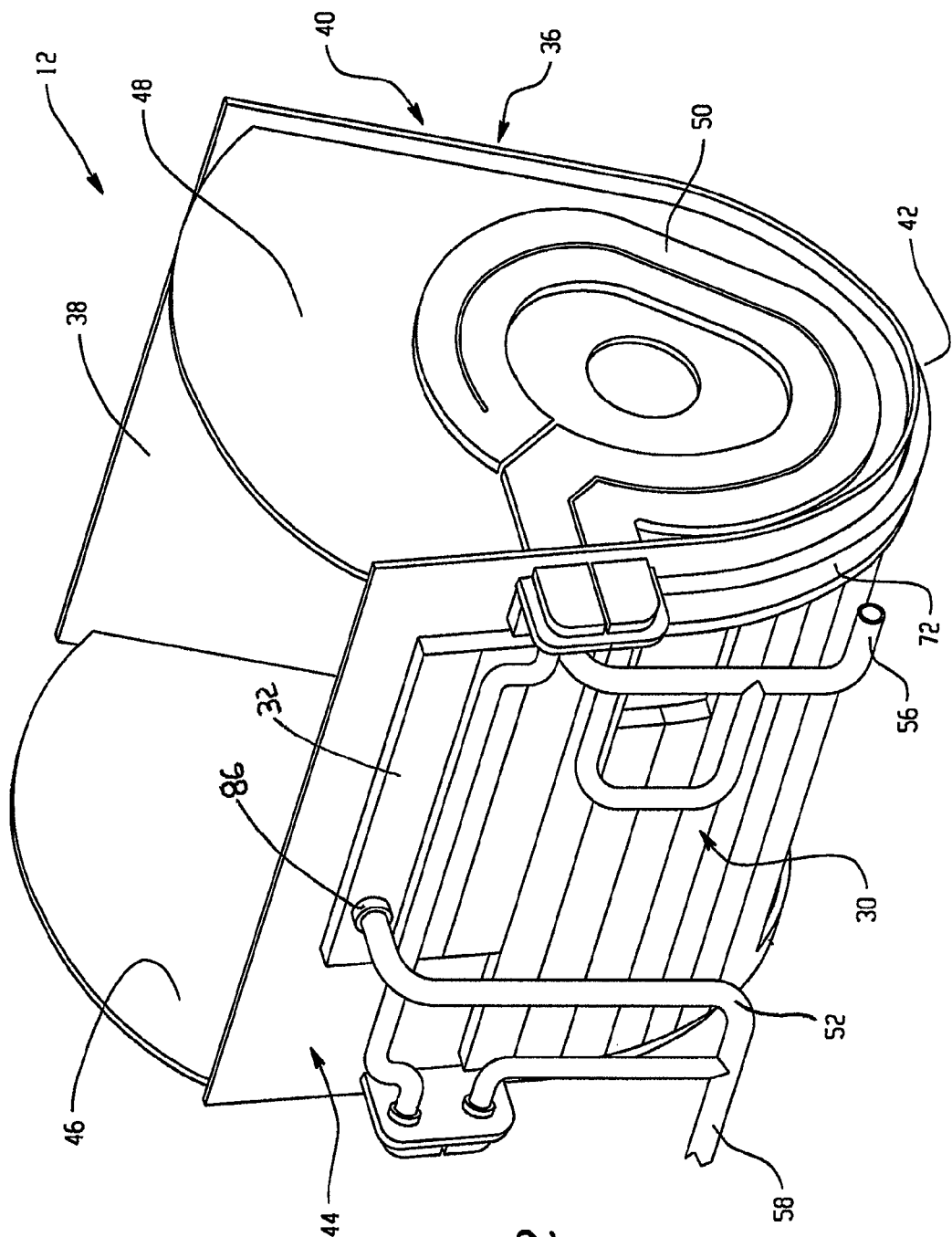
FIG. 2 is a perspective view of an embodiment of a mixer bowl including refrigeration jacket for use with the mixer of FIG. 1.

Referring now to FIG. 2, the mixing bowl 12 is provided with a refrigeration jacket 30 on its bowl body 36, which is formed by a plurality of channel members 32 (e.g., formed of stainless steel). The channel members 32 provide flow passages 34 (see FIG. 3) through which a coolant, such as cold water or glycol can travel in order to control or maintain a temperature within the mixing bowl 12 during a mixing operation.

The bowl body 36 includes a U-shaped sheet panel 38 (e.g., formed of stainless steel) that forms a front 40, a bottom 42 and a rear 44 of the bowl 12. Side panels 46 and 48 connect the front 40, bottom 42 and rear 44 of the bowl body 36. The refrigeration jacket 30 extends from the front 40 of the bowl body 36 to the rear 44 of the bowl body. Side channel members 50 are also provided on each of the side panels 46 and 48 so that coolant can also flow along the sides of the bowl body 36. A coolant passage assembly 52 connects the refrigeration jacket 30 to a coolant source 54 (see inlet 56) and also provides an outlet 58 for the coolant exiting the refrigeration jacket. The coolant passage assembly 52 also connects the side channel members 50 to the coolant source 54.

Figure 3:
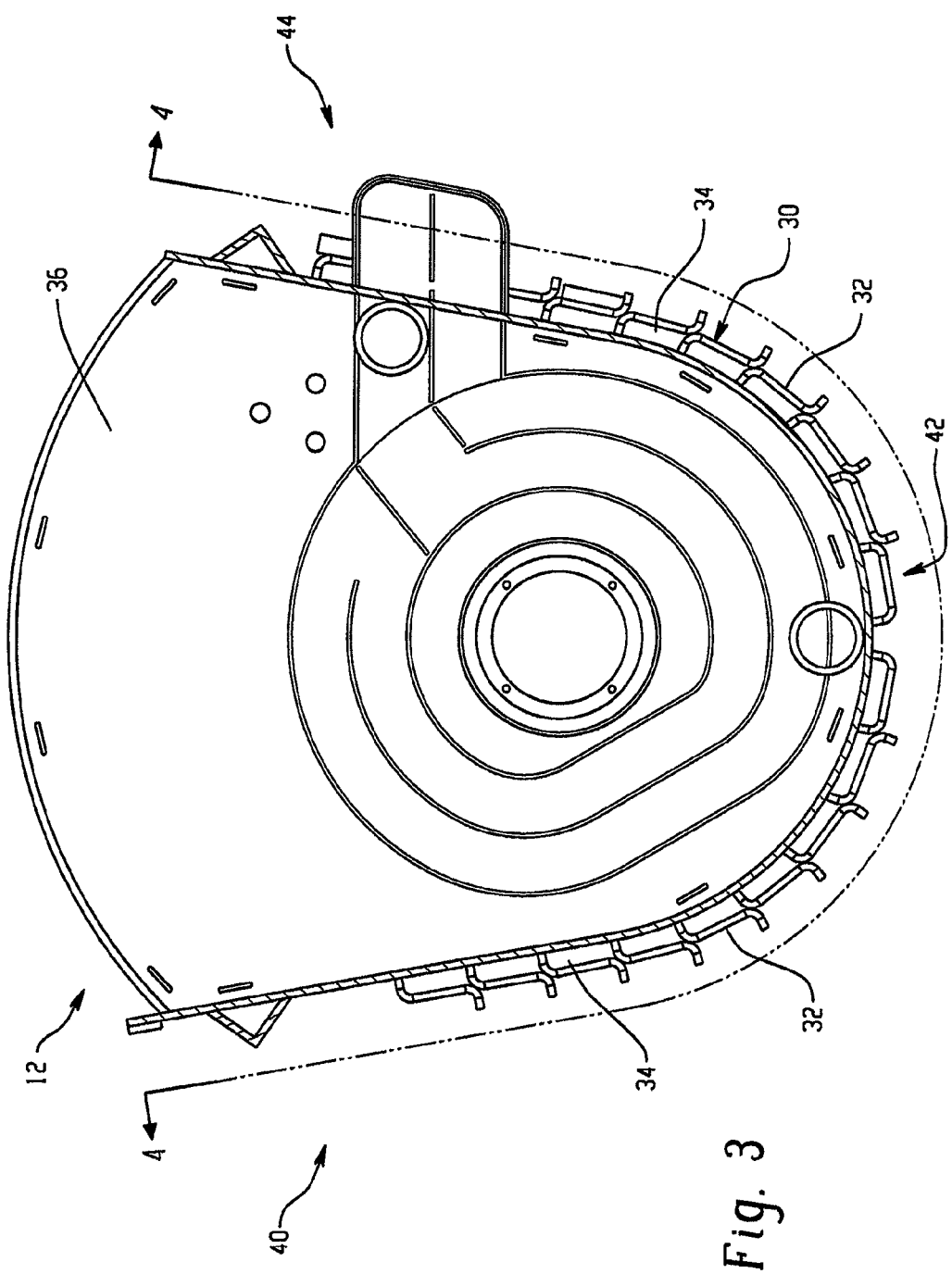
FIG. 3 is a section view of the mixer bowl of FIG. 2.

Referring to FIG. 3, the channel members 32 are aligned side-by-side, extending horizontally along the bowl body 36 and substantially parallel to each other. An outer U-shaped panel can be provided that extends in generally the same direction as the sheet panel 38, overlapping the channel members 32 and providing a space therebetween in which an insulating material (not shown) can be provided. In other embodiments, an outer U-shaped panel may not be provided.

Figure 4:
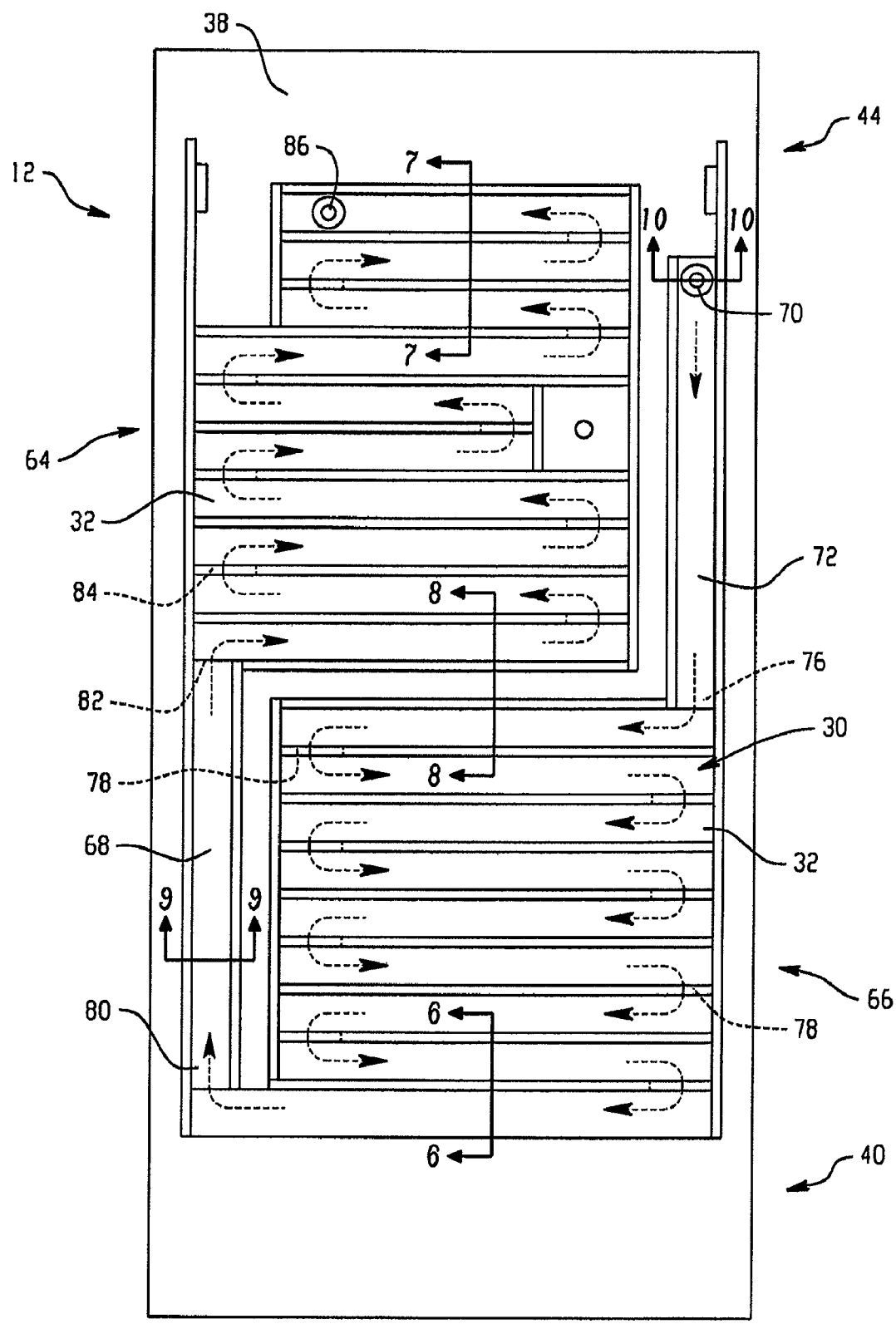
FIG. 4 is a laid-out view of the mixer bowl along line 4-4 of FIG. 3 illustrating coolant flow through the refrigeration jacket.

Referring to FIG. 4, the refrigeration jacket 30 provides a first serpentine flow path segment 64 and a second serpentine flow path segment 66 that is connected to the first serpentine flow path segment by a channel member 68 that extends in a front-to-back direction. Coolant enters the refrigeration jacket 30 via a jacket inlet 70 (see also FIG. 2) located at the rear 44 of the bowl body 36 and travels immediately toward the front 40 of the bowl body via another front-to-back extending channel member 72. The coolant then enters the second serpentine flow path segment 66 at entrance 76 and travels along each of the channel members 32 using side openings 78. The coolant then exits the second serpentine flow path segment 66 at exit 80 and flows along the front-to-back channel member 68 to an entrance 82 of the first serpentine flow path segment 64. The coolant then travels along each of the channel members 32 using side openings 84 and exits the first serpentine flow path segment 64 at exit 86 (see also FIG. 2). From the exit, the coolant is directed to the outlet 58 of the coolant passage assembly 52.

Flow of coolant through the first and second serpentine flow path segments 64 and 66 cools the sheet panel 38 and is used to refrigerate the internal volume of the bowl 12. The coolant flowing along the first and second flow path segments 64 and 66 leaves the refrigeration jacket 30 before it has been warmed up excessively. In some embodiments, a temperature sensor may be used to monitor temperature of the bowl 12, which can also be used to control the rate of coolant flow through the refrigeration jacket 30. A display may also be provided for indicating temperature to an operator.

Figure 5:
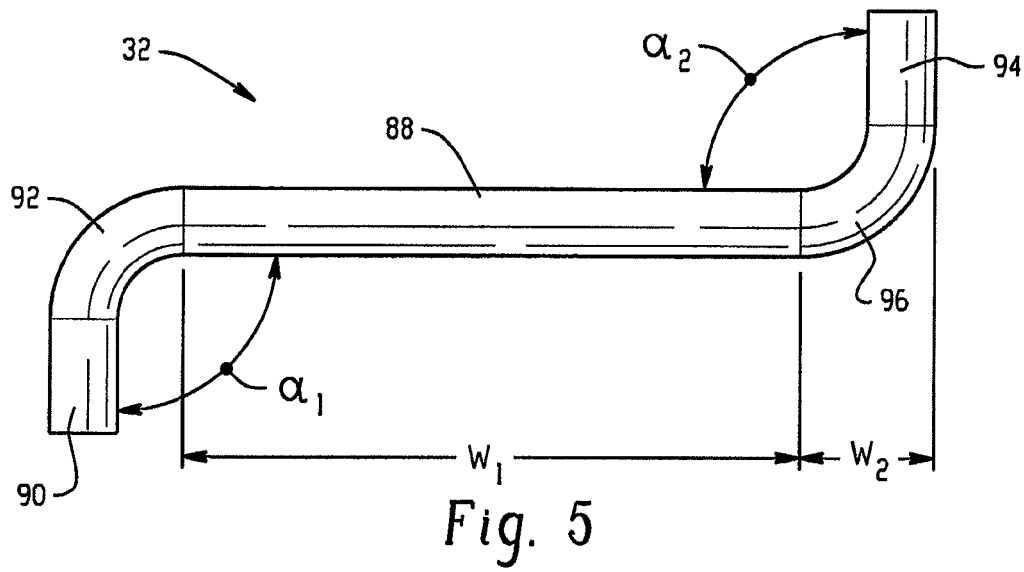
FIG. 5 is an end view of an embodiment of a channel member for forming the refrigeration jacket for the mixer bowl of FIG. 2.
Figure 11:
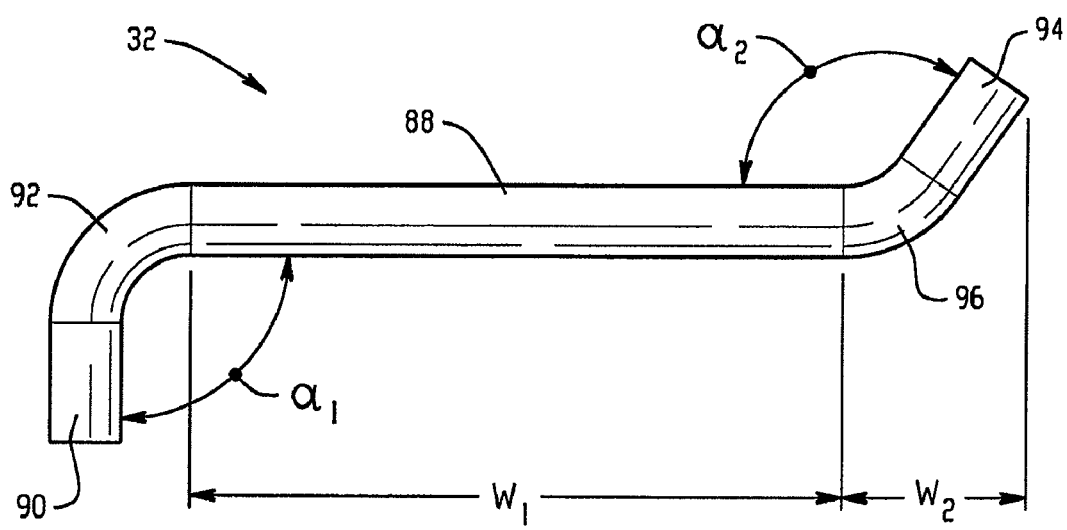
FIG. 11 illustrates another embodiment of a channel member for forming the refrigeration jacket.

Referring to FIG. 5, the refrigeration jacket 30 is formed of the channel members 32 extending along the bowl body 36 from side-to-side. Each channel member 32 is formed of a unitary plate of sheet material that is formed (e.g., by bending) to include an elongated center panel 88, a first leg 90 connected to the center panel by a first bend 92 and a second leg 94 that is connected to the center panel by a second bend 96. As can be seen, the first bend 92 bends toward the bowl body 36 and the second bend 96 bends away from the bowl body. Additionally, the curvature of the second bend 96 is about the same as that of the first bend 92 such that an angle $\alpha_2$ is about equal to $\alpha_1$ where $\alpha$ is measured from the respective leg to the center panel 88 as shown. In some embodiments, $\alpha_1$ and $\alpha_2$ are at least about 90 degrees and less than 180 degrees. In some embodiments, such as that shown by FIG. 11, $\alpha_2$ is different than $\alpha_1$. In this embodiment, $\alpha_2$ is greater than $\alpha_1$.

In some embodiments, at least about ¾ inch of the width of sheet material is bent to form the second leg 94, such as about one inch of the width of sheet material or more. In some embodiments, the width of a center panel portion $W_1$ is at least about 3 times (e.g., between about 3 and 5 times) the width of a second leg portion $W_2$ of the channel member 32. In some embodiments, the bend radius of the second bend 96 is about equal to the thickness of the sheet material (e.g., about ⅜ inch).

Figure 6:
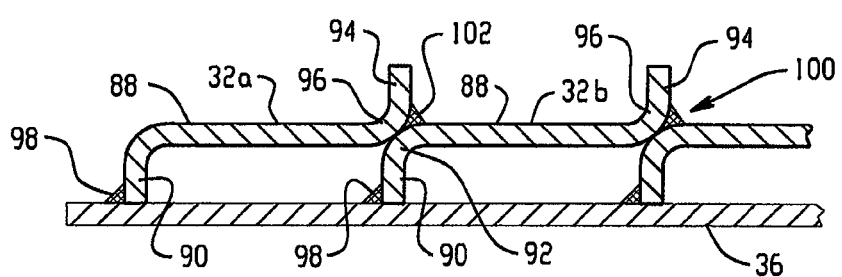
FIG. 6 is a section view of the refrigeration jacket along line 6-6 of FIG. 4.

FIG. 6 illustrates a section of the refrigeration jacket 30 along lines 6-6 of FIG. 4 exemplifying assembly of the refrigeration jacket. The first legs 90 of the channel members 32 extend toward the bowl body 36 while the second legs 94 extend away from the bowl body. The center panels 88 are spaced away from and face the bowl body 36.

The first legs 90 of the channel members 32 are welded at welds 98 thereby welding the channel members directly to the bowl body 36. The channel members 32 are also welded to an adjacent channel member. The second bend 96 of channel member 32a abuts the first bend 92 of channel member 32b such that the second leg 94 of the channel member 32a overhangs the first bend 92 of the channel member 32b, forming a seam 100 along the lengths of the channel members 32a and 32b. A weld 102 is applied along the seam 100 thereby connecting the adjacent channel members 32a and 32b together. The welds 98 and 102 also provide a fluid-tight seal along the lengths of the channel members 32 to prevent leakage of coolant from the refrigeration jacket 30.

Figure 7:
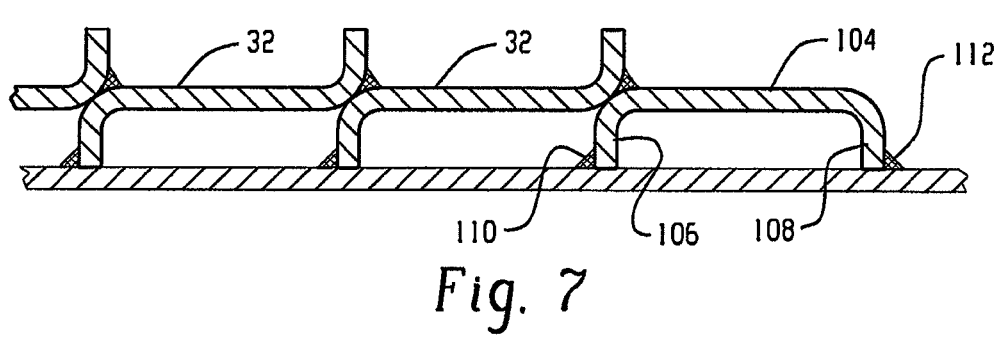
FIG. 7 is a section view of the refrigeration jacket along line 7-7 of FIG. 4.
Figure 8:
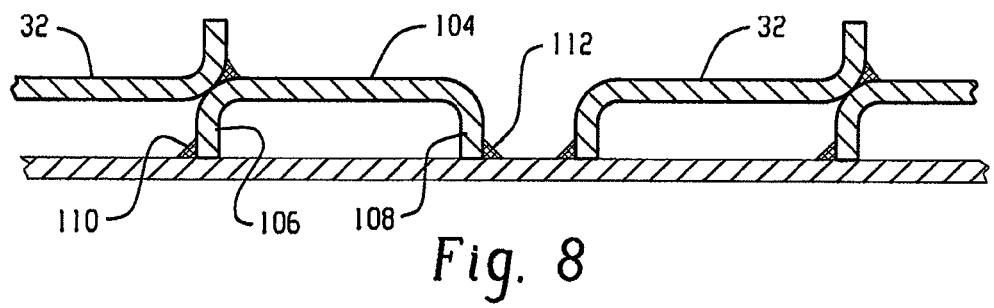
FIG. 8 is a section view of the refrigeration jacket along line 8-8 of FIG. 4.
Figure 9:
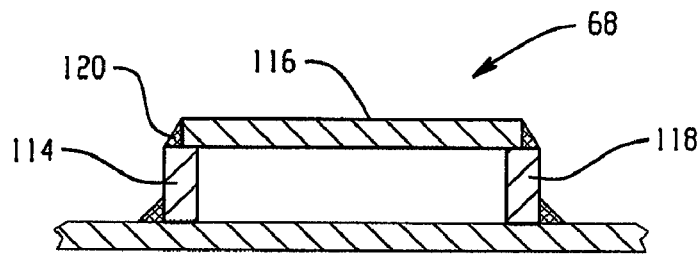
FIG. 9 is a section view of a front-to-back extending channel along line 9-9 of FIG. 4.
Figure 10:
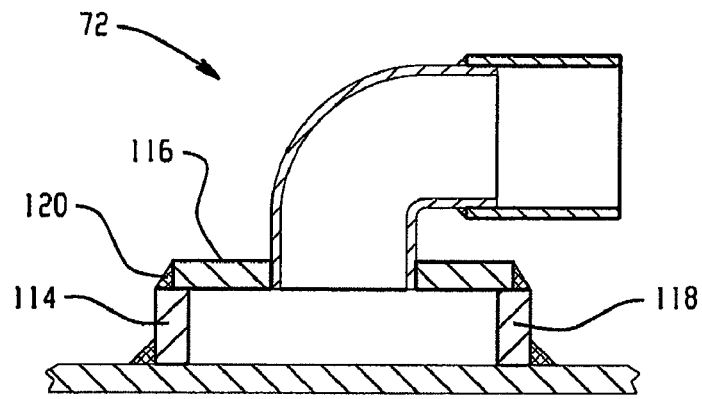
FIG. 10 is a section view of another front-to-back extending channel along line 10-10 of FIG. 4.

FIGS. 7 and 8 illustrate other sections of the refrigeration jacket 30 where the channel member 32 is connected to an end channel member 104. The end channel member 104 has first and second legs 106 and 108 that both extend in the same direction toward the bowl body 36. Welds 10 and 112 are applied to outside corners of the first and second legs 106 and 108. FIGS. 9 and 10 illustrate sections of the front-to-back extending channel members 68 and 72, which are formed by individual panels 114, 116, 118 welded together by welds 120.

The above-described refrigeration jacket 30 can provide a number of advantages. The refrigeration jacket 30 not only provides channels for coolant to flow, but also improves the strength of the bowl 12 by reinforcing the U-shaped sheet material 38. Such reinforcement of the sheet material 38 can allow for use of sheets of lesser thickness (e.g., ¼ inch or ⅜ inch stainless steel) which can improve heat transfer and cooling within the bowl, even given the relatively large capacity of the mixing machine, e.g., between about 400 and 3,200 pounds.

The second bend 96 can be located adjacent the first bend 92 of an adjacent channel member 32 thereby resulting in a tight contact point therebetween. The second leg 94 overhangs the adjacent channel member 32 to provide a pocket into which a multiple pass fillet weld can be applied thereby enabling a high quality welded joint. The above-described channel member design can also increase bending area moment of inertia of the channel cross section.

It is to be clearly understood that the above description is intended by way of illustration and example only and is not intended to be taken by way of limitation, and that changes and modifications are possible. For example, in some embodiments, various components may be used to reinforce the refrigeration jacket 30 such as straps and/or bars that run across the channels forming the refrigeration jacket. Accordingly, other embodiments are contemplated and modifications and changes could be made without departing from the scope of this application.

What is claimed is:

1. A dough mixer, comprising:
a bowl configured to be supported within a cabinet of the dough mixer, the bowl comprising
a bowl body defining an opening through which dough is inserted into the bowl for a mixing operation;
an agitator mounted in the bowl for rotation therein; and
a refrigeration jacket mounted to an exterior of the bowl body, the refrigeration jacket comprising a plurality of channel members, each channel member including a unitary plate member having:
an elongated center panel extending along a periphery of the bowl body, the center panel being spaced from and facing the bowl body;
a first leg connected to the center panel by a first bend, the first leg extending toward the bowl body; and
a second leg connected to the center panel by a second bend, the second leg extending away from the bowl body.

2. The dough mixer of claim 1, wherein the plurality channel members are mounted to the bowl body side-by-side such that their center panels extend along the periphery of the bowl body in substantially the same direction.

3. The dough mixer of claim 2, wherein the plurality of channel members include a first channel member and a second channel member adjacent the first channel member, the second bend of the first channel member adjacent the first bend of the second channel member thereby defining a seam extending along a length of the first channel member and the second channel member.

4. The dough mixer of claim 3 further comprising a weld extending along the seam.

5. The dough mixer of claim 4, wherein the weld is a multiple pass fillet weld.

6. The dough mixer of claim 3, wherein the second leg of the first channel member overhangs the first bend of the second channel member.

7. The dough mixer of claim 2, wherein the plurality of channel members define a series of side-by-side flow channels which are interconnected at alternate ends for creation of a generally serpentine flow path for cooling fluid.

8. The dough mixer of claim 1, wherein the first bend has a higher curvature than the second bend.

9. The dough mixer of claim 1, wherein a width of a center panel portion of the channel member is at least about 3 times a width of a second leg portion of the channel member.

10. A dough mixer, comprising:
a cabinet;
a bowl supported within the cabinet, the bowl comprising
a bowl body defining an opening through which dough is inserted into the bowl for a mixing operation;
an agitator mounted for rotation within the bowl; and
a refrigeration jacket mounted to an exterior of the bowl body, the refrigeration jacket comprising a plurality of channel members, each channel member including
an elongated center panel extending about a periphery of the bowl body, the center panel being spaced from and facing the bowl body;
a first leg connected to the center panel by a first bend that turns toward the bowl body; and
a second leg connected to the center panel by a second bend that turns away from the bowl body.

11. The dough mixer of claim 10, wherein the plurality channel members are mounted to the bowl body side-by-side such that their center panels extend along the periphery of the bowl body in substantially the same direction.

12. The dough mixer of claim 11, wherein the plurality of channel members include a first channel member and a second channel member adjacent the first channel member, the second bend of the first channel member adjacent the first bend of the second channel member thereby defining a seam extending along a length of the first channel member and the second channel member.

13. The dough mixer of claim 12 further comprising a weld extending along the seam.

14. The dough mixer of claim 13, wherein the weld is a multiple pass fillet weld.

15. The dough mixer of claim 12, wherein the second leg of the first channel member overhangs the first bend of the second channel member.

16. The dough mixer of claim 11, wherein the plurality of channel members define a series of side-by-side flow channels which are interconnected at alternate ends for creation of a generally serpentine flow path for cooling fluid.

17. The dough mixer of claim 10, wherein the first bend has a higher curvature than the second bend.

18. For a dough mixer comprising a cabinet, a bowl supported within the cabinet, the bowl comprising a bowl body defining an opening through which dough is inserted into the bowl for a mixing operation, an agitator mounted for rotation within the bowl and a refrigeration jacket mounted to an exterior of the bowl body, the refrigeration jacket comprising:
a channel member including
an elongated center panel extending along a periphery of the bowl body, the center panel being spaced from and facing the bowl body;
a first leg connected to the center panel by a first bend, the first leg extending toward the bowl body; and
a second leg connected to the center panel by a second bend, the second leg extending away from the bowl body.

19. The refrigeration jacket of claim 18 further comprising a plurality of the channel members, the plurality channel members mounted to the bowl body side-by-side such that their center panels extend along the periphery of the bowl body in substantially the same direction, the plurality of channel members including a first channel member and a second channel member adjacent the first channel member, the second bend of the first channel member adjacent the first bend of the second channel member thereby defining a seam extending along a length of the first channel member and the second channel member.

20. A method of forming a refrigeration jacket for a dough mixer comprising a cabinet, a bowl supported within the cabinet, the bowl comprising a bowl body defining an opening through which dough is inserted into the bowl for a mixing operation and an agitator mounted for rotation within the bowl, the method comprising:
forming a plurality of channel members such that each channel member including an elongated center panel, a first leg connected to the center panel by a first bend and a second leg connected to the center panel by a second bend; and
mounting the plurality of channel members to the bowl body such that the first leg extending toward the bowl body, the second leg extending away from the bowl body and the center panel being spaced from and facing the bowl body.

21. The method of claim 20, wherein the plurality of channel members define a series of side-by-side flow channels which are interconnected at alternate ends for creation of a generally serpentine flow path for cooling fluid.

* * * * *